United States Patent
Phely et al.

(10) Patent No.: US 10,660,260 B2
(45) Date of Patent: May 26, 2020

(54) AGRICULTURAL TYRE

(71) Applicant: OTICO, Chalmaison (FR)

(72) Inventors: Olivier Phely, Thenisy (FR); Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 138 days.

(21) Appl. No.: 14/936,019

(22) Filed: Nov. 9, 2015

(65) Prior Publication Data

US 2016/0128266 A1 May 12, 2016

(30) Foreign Application Priority Data

Nov. 10, 2014 (FR) ...................... 14 60861

(51) Int. Cl.
| | | |
|---|---|---|
| *A01C 5/06* | (2006.01) | |
| *B60C 7/00* | (2006.01) | |
| *B60C 19/00* | (2006.01) | |
| *B60C 7/12* | (2006.01) | |
| *B60C 3/06* | (2006.01) | |

(Continued)

(52) U.S. Cl.
CPC .............. *A01C 5/068* (2013.01); *B60B 3/087* (2013.01); *B60B 3/14* (2013.01); *B60B 9/12* (2013.01); *B60B 11/02* (2013.01); *B60C 3/06* (2013.01); *B60C 7/00* (2013.01); *B60C 7/102* (2013.01); *B60C 7/125* (2013.01); *B60C 19/001* (2013.01); *B60B 3/08* (2013.01); *B60B 25/00* (2013.01); *B60B 2310/305* (2013.01); *B60B 2310/306* (2013.01); *B60B 2360/10* (2013.01); *B60B 2360/141* (2013.01); *B60B 2360/30* (2013.01); *B60B 2900/351* (2013.01);

(Continued)

(58) Field of Classification Search
CPC .. B60C 3/06; B60C 7/06; B60C 7/125; B60C 11/0041; B60C 11/0058; B60C 11/0311; B60C 19/001; A01C 5/068
USPC .............. 172/518, 537, 539, 540; 152/209.5, 152/209.12, 209.13, 323, 327, 456

See application file for complete search history.

(56) References Cited

U.S. PATENT DOCUMENTS

| | | | | |
|---|---|---|---|---|
| 452,001 A | | 5/1891 | Yagn | |
| 1,150,537 A | * | 8/1915 | Roby | ..................... A01C 5/068 |
| | | | | 111/195 |

(Continued)

FOREIGN PATENT DOCUMENTS

| | | | | | |
|---|---|---|---|---|---|
| DE | | 411988 C | * | 4/1925 | ............. A01C 5/068 |
| DE | | 2535703 A1 | * | 2/1977 | ............. A01C 5/068 |

(Continued)

OTHER PUBLICATIONS

French Preliminary Search Report dated Jun. 30, 2015 in French Application 14 60861,filed on Nov. 10, 2014 (with English Translation of Categories of Cited Documents).

*Primary Examiner* — Matthew Troutman
(74) *Attorney, Agent, or Firm* — Oblon, McClelland, Maier & Neustadt, L.L.P.

(57) ABSTRACT

A non-inflatable tire for an agricultural implement, including a sole, a tread, and a pair of sidewalls connecting the sole to the tread is provided. A first sidewall extends from the sole to the tread, while the second includes an internal portion which extends from the sole to the tread and an external portion projecting from the tread. The first sidewall and the tread are designed so as to jointly hold the external portion of the second sidewall in line with the internal portion.

16 Claims, 7 Drawing Sheets

(51) Int. Cl.
  *B60B 3/08* (2006.01)
  *B60B 3/14* (2006.01)
  *B60B 9/12* (2006.01)
  *B60B 11/02* (2006.01)
  *B60C 7/10* (2006.01)
  *B60B 25/00* (2006.01)

(52) U.S. Cl.
  CPC ..... *B60B 2900/711* (2013.01); *B60C 2200/08* (2013.01); *B60Y 2200/22* (2013.01)

(56) References Cited

U.S. PATENT DOCUMENTS

| | | | | |
|---|---|---|---|---|
| 4,760,806 | A * | 8/1988 | Bigbee | A01C 5/064 |
| | | | | 111/135 |
| 5,533,793 | A * | 7/1996 | Walker | B60B 3/002 |
| | | | | 152/453 |
| D386,191 | S * | 11/1997 | Bruns | D15/28 |
| 7,438,006 | B2 * | 10/2008 | Mariman | A01C 5/064 |
| | | | | 111/164 |
| 9,474,203 | B2 * | 10/2016 | Anderson | A01C 5/06 |
| 2004/0089209 | A1 | 5/2004 | Joaquin Romagnoli | |
| 2011/0095597 | A1 * | 4/2011 | Knowles | B60B 3/08 |
| | | | | 301/64.303 |
| 2014/0305561 | A1 | 10/2014 | Phely et al. | |

FOREIGN PATENT DOCUMENTS

| | | | | | |
|---|---|---|---|---|---|
| DE | 3122713 | C1 * | 10/1982 | | A01C 5/068 |
| DE | 29715888 | U1 * | 11/1997 | | A01C 5/068 |
| DE | 10309663 | A1 * | 9/2004 | | A01B 49/06 |
| DE | 10309664 | A1 * | 9/2004 | | A01C 5/062 |
| DE | 10327377 | A1 * | 1/2005 | | A01C 5/062 |
| DE | 102008036201 | A1 * | 2/2010 | | A01C 5/064 |
| DE | 102013111357 | B4 * | 11/2015 | | A01C 5/068 |
| EP | 1 238 824 | A1 | 9/2002 | | |
| EP | 2 789 477 | A1 | 10/2014 | | |
| FR | 1472799 | | 3/1967 | | |
| FR | 2885008 | B1 * | 11/2007 | | A01B 29/043 |
| WO | WO-2004078053 | A2 * | 9/2004 | | A01B 49/06 |

* cited by examiner

Fig.9

AGRICULTURAL TYRE

BACKGROUND OF THE INVENTION

Field of the Invention

The invention relates to agricultural implements in general, and in particular implements intended to equip a seeder.

Description of the Related Art

A seeder generally comprises a plurality of implements disposed one after another: at least one front implement, typically a coulter, a disc or a tine, designed to open up a furrow in the ground; an intermediate implement, designed to place a seed or a grain in the bottom of the furrow; one or more rear implements which close the furrow and/or tamp the earth in the vicinity of the furrow.

The present text relates more particularly to implements that are capable of closing the furrow, at least partially.

Seeders can be used on uncultivated land, that is to say land in which the soil has not been previously worked. In this case, the soil can be dry and crumbly, and/or the ground can be covered with waste such as crop remains or roots, this complicating the operation of the seeder. Therefore, use is made of specific implements that are capable of operating under these difficult conditions. Said implements are generally designed to be very rigid. In order to close the furrow, the implement conventionally used is a rotary assembly of metal tines.

When an implement of this type comes into contact with a wet or sticky portion of land, the tines are soiled and the implement becomes practically ineffective.

BRIEF SUMMARY OF THE INVENTION

The Applicant has set itself the objective of improving the situation.

It proposes a non-inflatable tyre for an agricultural implement, of the type comprising a sole, a tread, and a pair of sidewalls connecting the sole to the tread. A first of these sidewalls extends from the sole to the tread. The second comprises an internal portion which extends from the sole to the tread and an external portion projecting from the tread. The first sidewall and the tread are designed so as to jointly hold the external portion of the second sidewall in line with the internal portion.

The tyre proposed is capable of penetrating hard ground. It makes it possible to work uncultivated land. In use, the tyre proposed makes it possible to dispense with clearing and/or ploughing of the land before starting a new crop therein.

The external portion forms a more rigid part of the tyre, capable of penetrating the ground. In particular, this makes the tyre in question robust and able to be used to close furrows, including on uncultivated land. By contrast, the rest of the tyre is fairly flexible, thereby making it easier to clean, in particular favouring the removal of soil.

The tyre proposed generally deforms during rolling, while its external portion remains held in its initial orientation, this making it possible to break the surface layers of the land and to penetrate the latter.

The tyre is suitable for sticky land, for example where the soil is wet. The soil which could stick thereto is removed by the deformation movements. In brief: the tyre proposed has a self-cleaning nature absent from the conventional implements.

The tread of the tyre proposed can act as a depth gauge: it follows the differences in height of the land such that the external portion of the tyre penetrates the soil to a more or less constant depth. This makes it possible to dispense with the depth wheels conventionally attached to the rear implements.

The tyre proposed has a double dynamic behaviour: locally, resistance to deformation in order to act on solid soil, and overall malleability which reduces the risk of accumulation of this soil.

According to a second aspect of the invention, the Applicant proposes an agricultural implement comprising at least one wheel that includes a wheel body and a tyre as defined above mounted around the wheel body.

The wheel may be mounted so as to rotate about an axis, the axis being inclined at a non-zero angle with respect to the ground and/or inclined at a non-right angle with respect to the direction of forward travel of the agricultural implement. The directions of application of the forces of the wheel towards the ground can be adapted depending on the conditions of the land.

The agricultural implement may comprise at least two wheels that each include a wheel body and a tyre mounted around the wheel body. Each of the two wheels is mounted so as to rotate in such a way that its respective axis of rotation is inclined at a non-zero angle with respect to the ground.

The two wheels may be arranged symmetrically with respect to one another about a mid plane such that the first sidewall of each wheel is directed towards the mid plane. The two external portions each push the soil laterally in directions oriented towards one another. This configuration is particularly effective for closing furrows.

The two wheels may be arranged symmetrically with respect to one another about a mid plane such that the second sidewall of each wheel is directed towards the mid plane. The two external portions each press the soil substantially vertically. This configuration is particularly effective for closing furrows by scraping the walls of said furrows.

The tyre proposed and/or at least one of the tyres with which the agricultural implement proposed is equipped may have the following optional features, on their own or in combination with one another:

- The external portion is rigid while the first sidewall and the tread are flexible. The opposite behaviour of these two tyre parts, made in one piece, increases the performance of the external part of the second sidewall for penetrating the soil, while the tread and the first sidewall more easily remove the soil which tends to accumulate on the exterior surfaces of the tyre.
- The external portion comprises teeth distributed around its periphery. Each tooth behaves in a manner substantially independent of the other teeth. If one of them twists in contact with the soil, the following tooth remains in line with the internal part of the second sidewall without being driven in an undesired bending movement.
- The external portion has a height of between 45% and 70% of an overall height of the second sidewall. The external portion thus penetrates deeply into the soil. The crumbling of the soil is more effective.
- The external portion has a profile which narrows in a radial direction oriented from the inside to the outside. The external portion has better integrity in operation by virtue of a wide base, while the narrow end penetrates more easily into the soil. During penetration, the soil is moved away on either side of the external part by sliding along the lateral surfaces. This operation is particularly advantageous for closing a furrow.

The second sidewall bears a lateral surface that is oriented towards the outside of the tyre and is substantially continuous between the internal portion and the external portion. Maintaining the alignment of the external portion with the internal portion during operation is improved. The continuity allows better distribution of stresses in the second sidewall. The absence of irregularity limits the concentrations of stresses and the appearance of a region of incipient deformation during compression. Moreover, the soil slides more easily along the lateral surface without catching thereon.

The first sidewall and the tread comprise an elastomer and the second sidewall comprises an elastomer, a thermoplastic elastomer and/or a thermoplastic with a hardness greater than that of the elastomer of the first sidewall and of the tread. The difference in composition and hardness accentuates the difference in dynamic behaviour between the external part and the rest of the tyre. This increases the performance of the external part of the second sidewall for penetrating the soil while the tread and the first sidewall more easily remove the soil which tends to accumulate on the exterior surfaces of the tyre.

The tyre comprises an elastomer with a Shore A hardness of between 63 and 70. Such a hardness range has made it possible to obtain good results on land known to be impossible to work without previously working the soil. In particular, heterogeneous land comprising dry portions and wet portions can be worked with one and the same tyre during one and the same operation.

The first sidewall and the tread comprise an elastomer with a Shore A hardness of between 50 and 65, and the second sidewall comprises an elastomer with a Shore A hardness of between 70 and 90. Such a difference in hardness between the different parts of a tyre is more specifically adapted to the specific functions of each of the parts, that is to say the penetration of the soil on the one hand, and self-cleaning and maintenance of the orientation of the external portion on the other hand.

The sole, the tread and the pair of sidewalls jointly define an interior space. The tyre also comprises an opening that places the interior space in fluidic communication with the outside. Such a tyre which is neither inflated nor inflatable has greater flexibility for cleaning the exterior surfaces without this impairing the penetration capability of the external portion.

BRIEF DESCRIPTION OF THE SEVERAL VIEWS OF THE DRAWINGS

Further features, details and advantages of the invention will become apparent from reading the following description and from the appended drawings, in which.

DETAILED DESCRIPTION OF THE INVENTION

The drawings and the description below essentially contain elements of a certain nature. They can therefore be used not only to make the present invention easier to understand but also to contribute towards defining it, where appropriate. It should be noted that elements such as the profile geometry of the tyres are difficult to define in full, other than by drawing them.

In the following text, the wheel 1 is described using terms such as height, lateral, side, top, bottom, right and left in accordance with an orientation of the wheel in which the axis of rotation XX represents the lateral, horizontal direction. However, and as will be described for example with reference to FIGS. 7 and 8, the wheel can be used under conditions under which this axis of rotation XX is not parallel to the ground, is not horizontal and/or is not perpendicular to a direction of forward travel of the wheel.

FIGS. 1 to 4 show an agricultural implement in the form of a wheel 1. The wheel 1 comprises a tyre 3, a pair of flanges 5, 7, fasteners 9 and a bearing assembly 11. The wheel 1 has an axis of rotation referenced XX. The wheel 1 has a mid plane perpendicular to the axis of rotation XX.

In the example described here, the two flanges 5 and 7 are similar and symmetric to one another about a mid plane of the wheel 1. Each flange 5, 7 has the overall shape of a disc having an interior face and an exterior face.

Each of the flanges 5, 7 has a central opening passing through it from the exterior face to the interior face. The opening has a substantially circular outline. The outline of the central opening projects from the exterior face. Each of the flanges 5, 7 has through-passages between the interior face and the exterior face for the fasteners 9. The outlines of the through-passages project from the interior face.

In an assembled state, the interior faces of the flanges 5, 7 are mounted against one another. As is apparent from FIG. 5, the outlines of the through-passages in one of the flanges 5; 7 bear against the corresponding outlines of the through-passages in the other of these flanges 5, 7. The central openings in the flanges 5, 7 are aligned along the axis of rotation XX.

The two flanges 5, 7 are held together by means of fasteners 9 disposed in the passages provided to this end. Here, the fasteners 9 comprise screw/nut pairs. The head of the screw and the corresponding nut bear against the exterior face of one and the other of the flanges 5, 7, on the outline of the through-passages. The assembly formed by the two flanges 5, 7 and the fasteners 9 can be seen as at least one part of a wheel body 2.

The wheel body 2 has a through-opening centred on the axis of rotation XX. Those parts of the wheel body 2 that surround the opening form a hub of the wheel 1. This opening is shaped into an open housing that is able to accommodate the bearing assembly 11.

Each of the outlines of the central openings of the flanges 5, 7 is shaped into a rim. Each of these rims forms an axial abutment for the bearing assembly 11 so as to limit the sliding thereof in the axial direction XX and to hold it between the two flanges 5, 7. Here, the housing provided to accommodate the bearing assembly 11 is designed to house a bearing assembly 11, or bearing unit, known per se. The bearing assembly 11 is in the form of a cartridge that is ready to be installed in the wheel body 2 while the flanges 5, 7 are being assembled together.

The bearing assembly 11 has a bore that is centred on the axis of rotation XX and opens onto each side of the wheel body 2. The bore in the bearing assembly 11 is designed to be slipped onto an axle of an agricultural machine.

Each flange 5, 7 has a peripheral rim designed to come into contact with a part of the tyre 3. Here, the rim is in the form of a folded annular wing. Each rim, seen in cross section, has a hook shape that is open towards the interior face. In the assembled state, the flanges 5, 7 hold a part of the tyre 3 between one another by way of their respective peripheral rim. Seen in cross section, the hooks close up towards one another like a jaw in order to grip a part of the tyre 3.

Here, the flanges 5, 7 are obtained by stamping a metal plate.

The tyre 3 has an annular overall shape centred on the axis of rotation XX. The tyre 3 comprises a sole 21, a tread 23 and a pair of sidewalls 25, 27. The sidewalls 25, 27 connect the sole 21 to the tread 23.

The sole 21, the tread 23 and the sidewalls 25, 27 jointly define a free space 29. The free space 29 has an annular overall shape which is continuous in the circumference of the tyre 3. Here, an opening places the free space 29 in fluidic communication with the outside. Such an opening is obtained for example by having a needle passing through the sole 21 during the moulding of the tyre 3. By virtue of this opening, the tyre 3 is neither inflatable nor inflated. The non-inflated nature of the tyre 3 makes it easier to deform the first sidewall 25 and the sole 21. Such deformations while the tyre 3 is rolling improve the removal of soil which can accumulate on the exterior surfaces of the tyre 3. The opening placing the interior space 29 in communication with the outside of the tyre 3 is not visible in the figures.

Figure 5:
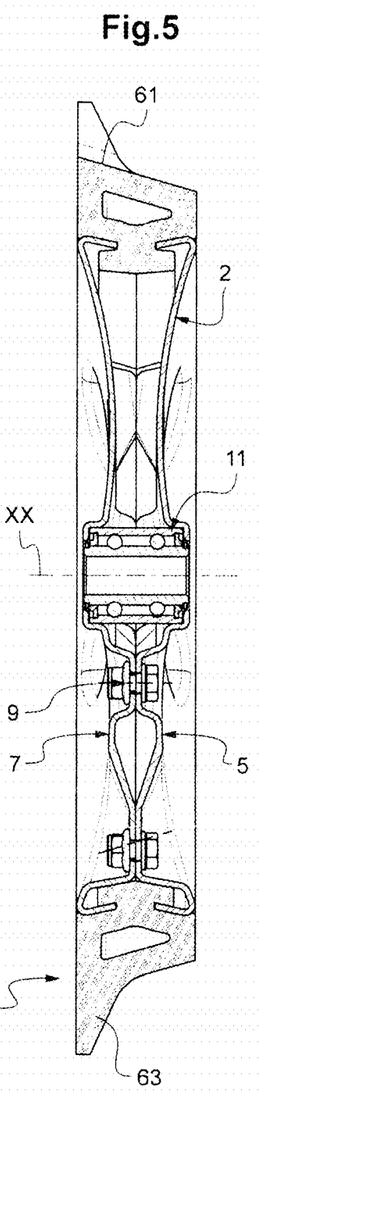
FIG. 5 shows a view in section along the double segment V-V in FIG. 4.
Figure 6:
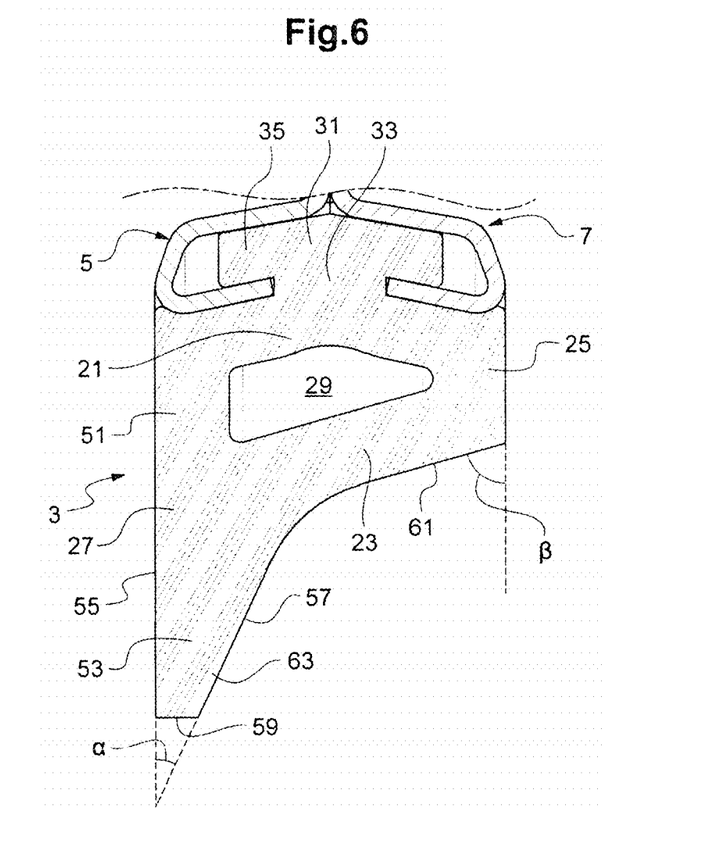
FIG. 6 shows a detail view of FIG. 5.

In the example described here, the tyre 3 also comprises a heel 31. As seen in cross section, as shown in FIGS. 5 and 6, the heel 31 forms a protrusion from the sole 21 that is oriented radially towards the inside of the tyre 3. The heel 31 comprises a constriction 33 close to the sole 21. The constriction 33 is extended by a widened portion 35 in the direction of the centre of the tyre 3. In other words, the heel 31 has a profile in the form of a "mushroom". The heel 31 is designed in a manner corresponding to the shape of the wheel body 2, and in particular in a manner corresponding to the shape of the peripheral rims of the flanges 5, 7. As can be seen in FIG. 6, when the flanges 5, 7 are mounted on one another, the peripheral rims of the flanges 5, 7 in the form of hooks grip the constriction 33 of the heel 31. The tyre 3 is then held with respect to the flanges 5, 7. Such engagement prevents separation of the tyre 3 with respect to the flanges 5, 7, in particular in a radial direction.

In variants, the tyre 3 does not have a heel 31. The wheel body 2 comprises a substantially cylindrical peripheral surface, or rim, about which the sole 21 of the tyre 3 is fitted. The wheel body 2 can have an annular rim that projects from the rim on each side of the wheel body 2. Such annular rims prevent the tyre 3 from sliding around the rim in the direction of the axis of rotation XX. The wheel body 2 can be obtained by assembling a number of pieces such as flanges or can be formed in one piece.

Reference is now made to FIGS. 5 and 6, which show the cross-sectional view of the tyre 3. The wheel 1 shown in FIGS. 5 and 6 is in the unloaded state. The term unloaded is understood here to mean free of external mechanical stresses, and in particular those generated by the weight of the wheel and/or of the agricultural machine on the ground. The tyre 3 is in a non-deformed state. The tyre 3 is substantially free of stress.

The first sidewall 25 extends from the sole 21 to the tread 23. The second sidewall 27 comprises an internal portion 51 which extends from the sole 21 to the tread 23 and an external portion 53 projecting from the tread 23. As seen in cross section, the external portion 53 is substantially in line with the internal part 51 in a radial direction.

The sole 21 and its heel 31 exhibit symmetry about the mid plane of the wheel 1. As seen in cross section, the profile of the sole 21 and the profile of the widened portion 35 of the heel 31 are, in this case, shaped as chevrons. In other words, the sole 21 and the widened portion 35 of the heel 31 have an annular overall shape which is not strictly cylindrical. The two lateral halves of the sole 21 and of the widened portion 35 of the heel 31, respectively, are substantially frustoconical. Here, the diameter of the sole 21 and of the widened portion 35 of the heel 31, respectively, increases in size in a substantially continuous manner from its central part to both of its lateral extremities.

Apart from the hook shapes, the peripheral rims of the flanges 5, 7 correspond in shape to the chevron shapes of the sole 21 and of the heel 31. The peripheral rims of the flanges 5, 7 form a seat for the tyre 3. The correspondence in shape also limits the accidental sliding of the tyre 3 in the direction of the axis of rotation XX about the wheel body 2. Thus, the holding of the tyre 3 is improved during operation. The risk of the peripheral rims of the flanges 5, 7 damaging the heel 31, or even shearing the constriction 33, is low. In variants, the sole 21 and/or the widened portion 35 of the heel 31 have a substantially cylindrical shape.

The tyre 3 is asymmetric about the mid plane of the wheel 1. Here, the first sidewall 25 has a height in the radial direction that is less than the height of the internal portion 51 of the second sidewall 27. The tread 23 connects a radial end of the first sidewall 25 to a radial end of the internal portion 51 of the second sidewall 27. The tread 23 has a frustoconical overall shape, the apex of which is situated beyond the first sidewall 25. The tread 23 bears an exterior surface 61, away from the free space 29. As seen in cross section, the tread 23 has a profile inclined at a non-zero angle with respect to the axis of rotation XX. Thus, the diameter of the peripheral surface 61 increases from the first sidewall 25 in the direction of the second sidewall 27. As seen in cross section, the tread 23 forms an angle β (beta) with a radial plane. The angle β is measured, in cross section, between the exterior surface 61 and a straight line perpendicular to the axis of rotation XX passing through the first sidewall 25, as is shown in FIG. 6. The angle β is between 0° and 90°.

The external portion 53 of the second sidewall 27 is disposed substantially in line, radially, with the internal portion 51 of the second sidewall 27. The external portion 53 can be seen as an annular crest, or a crown, that projects from the tread 23 and is substantially coplanar with the internal portion 51 of the second sidewall 27.

In the example described here, the second sidewall 27 bears a lateral surface 55 oriented towards the outside of the tyre 3. The lateral surface 55 is substantially continuous between the internal portion 51 and the external portion 53. Here, the lateral surface 55 is substantially planar and substantially perpendicular to the axis of rotation XX. Such continuity makes it easier for the external portion 53 to penetrate into the soil. The absence of irregularity limits the risks of the accumulation of adhering soil. From a dynamic point of view, the regularity of the lateral surface 55 limits the risks of a region of incipient bending of the tyre 3 under stress appearing.

In the example described here, the external portion 53 of the second sidewall 27 bears a lateral surface 57 away from the lateral surface 55 and oriented towards the first sidewall 25. The lateral surface 57 has a frustoconical overall shape, the apex of which is situated beyond the lateral surface 57, on the side of the first sidewall 25. Thus, the diameter of the lateral surface 57 increases from the first sidewall 25 in the direction of the exterior lateral surface 55. As seen in cross section, the lateral surface 57 has a profile inclined at a non-zero angle with respect to a radial plane. As seen in cross section, the lateral surface 57 forms an angle α (alpha) with a radial plane. The angle α is measured, in cross section, between the lateral surface 57 and a straight line perpendicular to the axis of rotation XX passing through the second sidewall 27, as is shown in FIG. 6. The angle α is between 0° and 90°. In the case of an exterior lateral surface 55 perpendicular to the axis of rotation XX, the angle α corresponds likewise to the angle between the opposite lateral surfaces 55, 57 of the external portion 53 of the second sidewall 27.

The lateral surface 57 of the external portion 53 of the second sidewall 27 is connected to the peripheral surface 61 of the tread 23 by a fillet. In other words, the angle between the lateral surface 57 of the exterior portion 53 of the second sidewall 27 and the surface 61 of the tread 23 is substantially rounded. This makes it possible to limit the risks of an incipient bending region appearing. During operation, the peripheral surface 61 comes into contact with the ground 150, while the external portion 53 is already inserted into the ground 150. The peripheral surface 61 forms a stop surface for the insertion of the external portion 53, such that the external portion 53 works at a substantially constant depth, following the differences in height of the ground 150. The peripheral surface 61 can replace an additional depth wheel.

Figure 8:
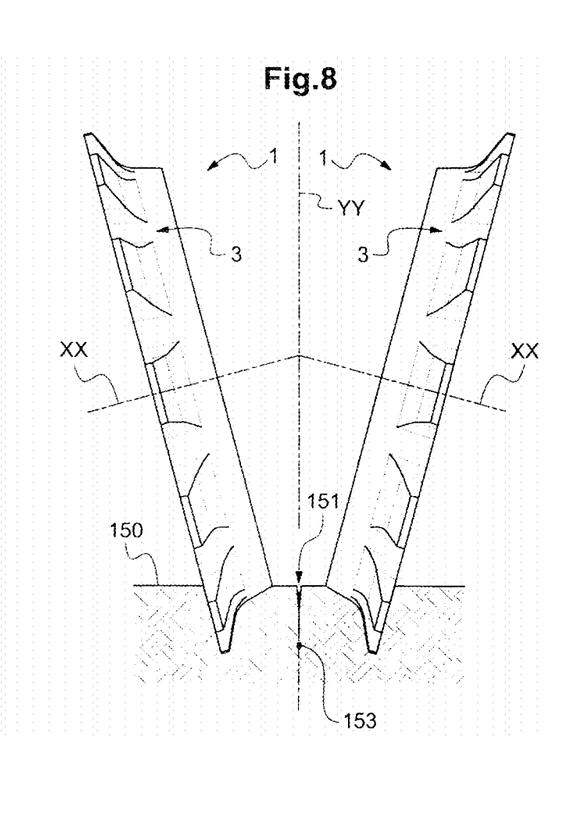

In order to define the dimensions, in particular in accordance with FIG. 8, the fillet is considered to belong to the lateral surface 57 of the external portion 53 of the second sidewall 27. Consequently, the width of the base of the external portion 53 represents, in this case, approximately half the width 104 of the tyre 3.

The orientations of the lateral surface 55 and of the lateral surface 57 give the external portion 53 a profile in the shape of a point. The radial end of the external portion 53 is cut off. In other words, the external portion 53 has a peripheral surface 59. The peripheral surface 59 is substantially cylindrical here. As seen in profile, the peripheral surface 59 is substantially parallel to the axis of rotation XX. The peripheral surface 59 has a width 107 in the direction of the axis of rotation XX that is substantially less than the average thickness of the internal portion 51 of the second sidewall 27. Generally, the shape of the profile of the external portion 53 is chosen so as to make it easier to penetrate the soil while the tyre 3 is rolling.

The angle α is between 10° and 45°, for example around 25°, here. The angle β is between 45° and 90°, for example around 74°, here.

The external portion 53 of the second sidewall 27 comprises teeth 63. The teeth 63 are distributed around the periphery of the external portion 53. As is visible in the top part of FIG. 5, the external portion 53 between the teeth 63 comprises a section with a height less than that of a tooth 63. The external portion 53 of the second sidewall 27 is thus discontinuous around the circumference of the tyre 3. Over the angular portions situated between two teeth 63, the peripheral surface 61 of the tread 23 is extended substantially across the entire width of the tyre 3 and meets the exterior lateral surface 55. In these angular portions, as seen in profile, the peripheral surface 61 is straight. In variants, the angular portions of the tyre 3 between two teeth 63 have an external portion 53 which projects with respect to the peripheral surface 61.

In the example described here, there are twelve teeth 63, which are equidistant from one another. In variants, the number of teeth 63 may be different. The teeth 63 may be distributed heterogeneously along the circumference of the tyre 3.

In the example described here, the angular portion taken up by one tooth 63 is substantially equivalent to the angular portion that does not have a tooth and separates two adjacent teeth 63.

Figure 1:
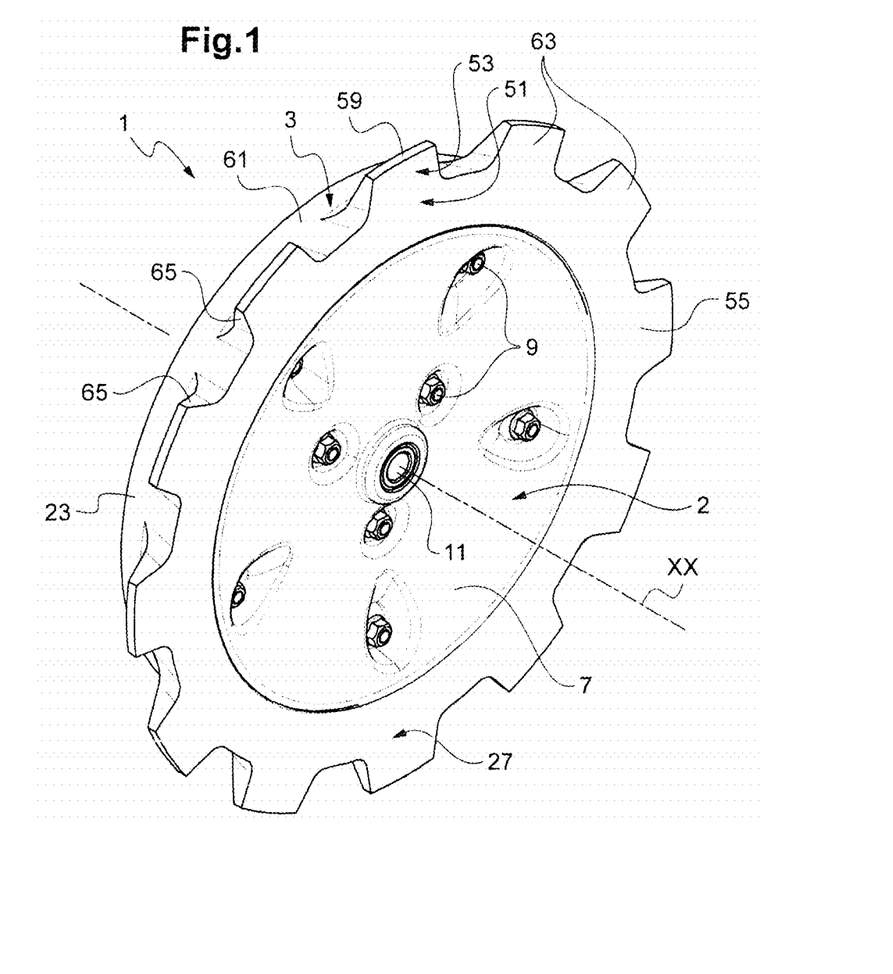
FIG. 1 shows a perspective view of a wheel equipped with a tyre according to the invention.
Figure 2:
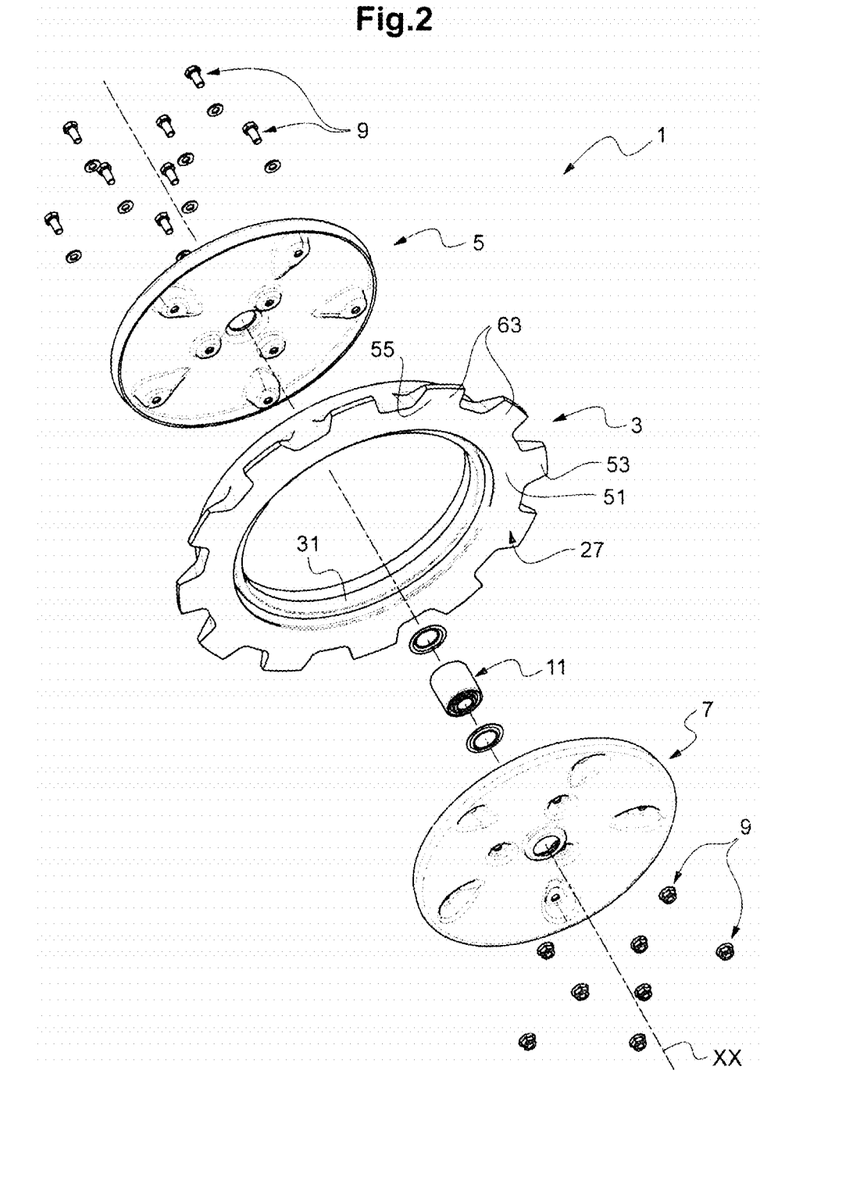
FIG. 2 shows an exploded and perspective view of the wheel from FIG. 1.
Figure 3:
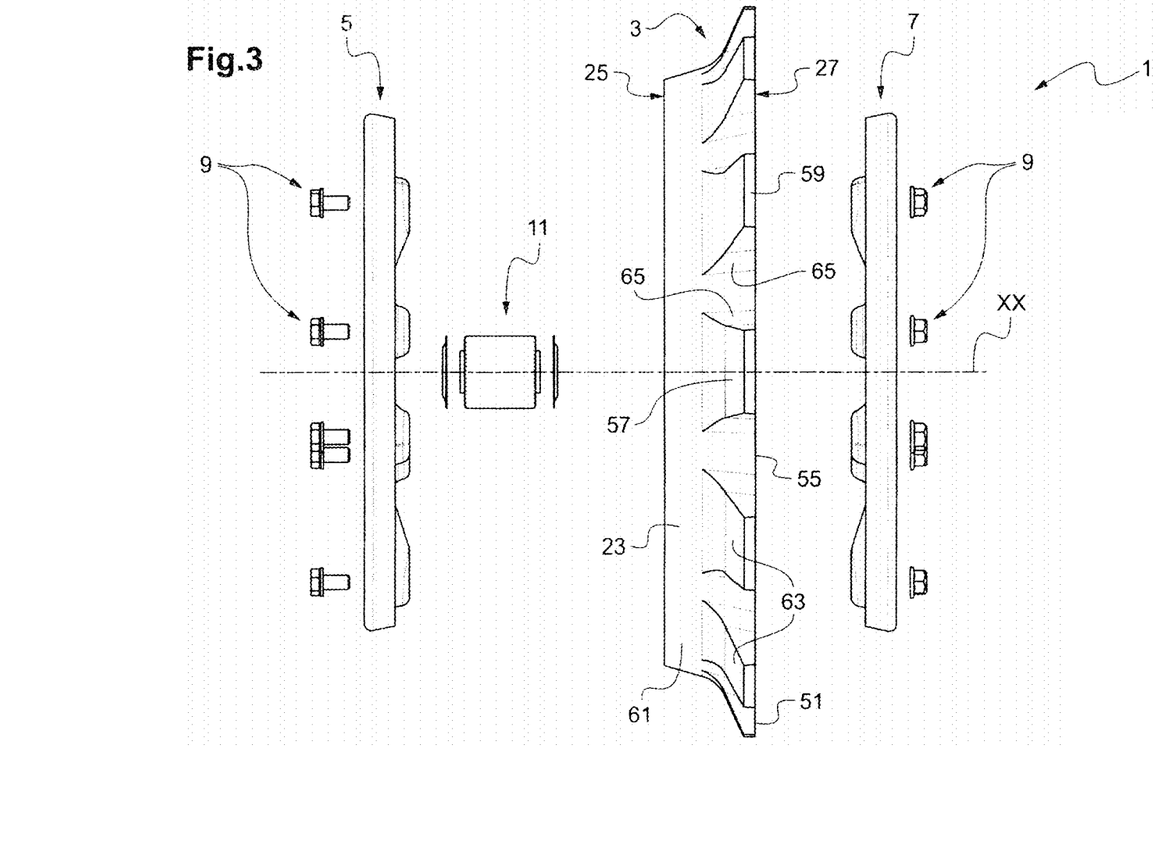
FIG. 3 shows an exploded side view of the wheel from FIG. 1.
Figure 4:
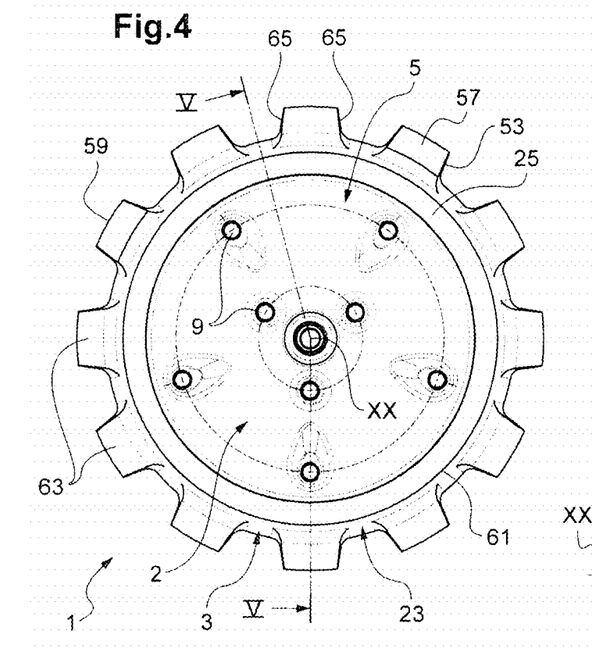
FIG. 4 shows a side view of the wheel from FIG. 1.

In side view and as is shown in FIG. 4, the teeth 63 have faces 65 that connect the lateral surfaces 55 and 57 together. Each tooth 63 has two faces 65 that face away from one another, each substantially facing a face 65 of an adjacent tooth 63. The faces 65 of one tooth 63 are substantially symmetric to one another about a radial plane passing through the middle of the tooth 63. In other words, the shape of the faces 65 is independent of the direction of rotation of the wheel 1 in operation. In variants, the faces 65 of one tooth 63 are different. For example, one of the two faces 65 is a leading edge while the other is a trailing edge, depending on the direction of rotation of the wheel 1 in operation.

Here, the faces 65 are mutually shaped such that, in the side view shown in FIG. 4, the dimension of the tooth 63 around the circumference narrows from its base connected to the tread 23 to its radial end and to its peripheral surface 59. Such a configuration improves the penetration of the teeth 63 into the soil while the tyre 3 is rolling.

From a dynamic point of view, the discontinuity of the external portion 53 of the second sidewall 27, in this case a configuration as a set of teeth 63, makes the angular portions of the external portion 53 of the second sidewall 27 substantially independent. While the tyre 3 is rolling, the movements and deformations of one tooth 63 are substantially independent of the movements and deformations of the adjacent teeth 63.

Figure 9:
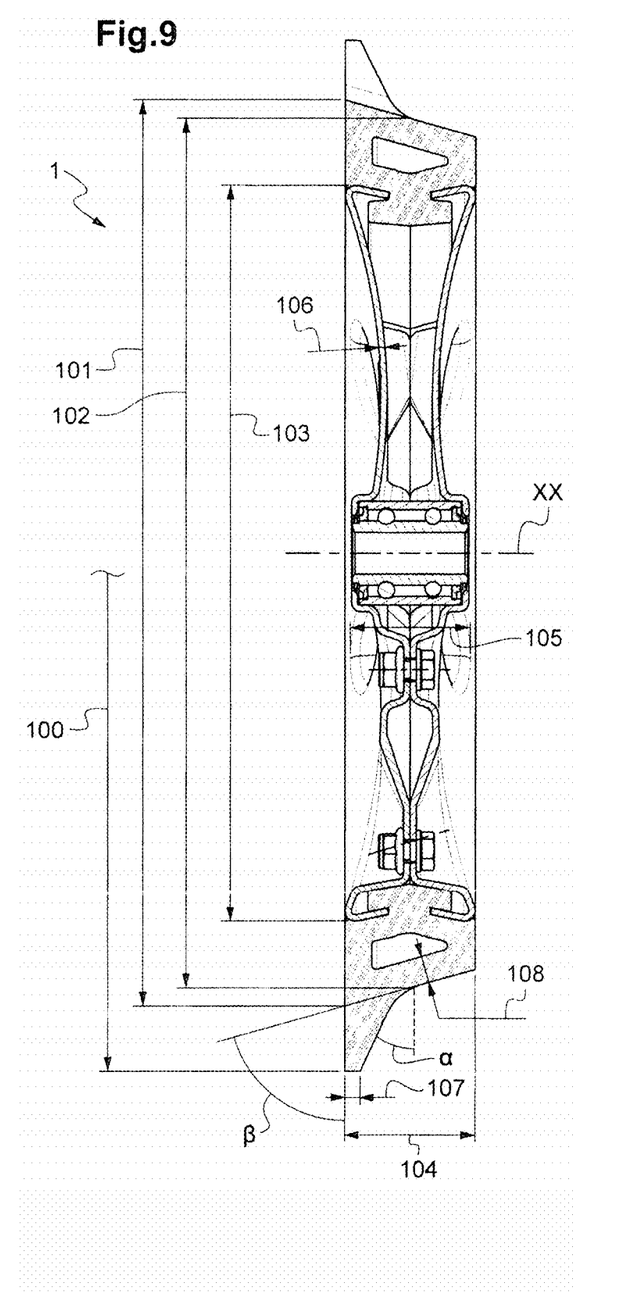
FIG. 9 is a view similar to FIG. 5, in which some of the dimensions are referenced.

Reference is now made to FIG. 9 in order to define the dimensions of the tyre 3. In FIG. 9, which shows the tyre 3 in the state mounted on the wheel body 2 and at rest, the following dimensions are referenced:

- The maximum diameter 100 of the tyre 3, taken between the peripheral surfaces 59 of diametrically opposed teeth 63. The maximum diameter 100 is between 300 and 600 millimetres, for example around 400 millimetres.
- The maximum diameter 101 of the tyre 3, taken between diametrically opposed angular portions that do not have teeth 63. The diameter 101 is between 260 and 525 millimetres, for example around 350 millimetres.
- The maximum diameter 102 of the tyre 3 without the external portion 53. It will be noted that this dimension is taken at the base of the external portion 53, that is to say substantially halfway across the width of the tyre 3 in this case. The diameter 102 is between 250 and 500 millimetres, for example around 333 millimetres.
- The inside diameter 103 of the tyre 3. It will be noted that this dimension is taken at the surface of the sole 21 oriented radially towards the inside, without the heel 31, and at a lateral end of the section of the tyre 3. The inside diameter 103 of the tyre 3 in the mounted state corresponds substantially to the outside diameter of the wheel body 2. The inside diameter 103 is between 215 and 430 millimetres, for example around 284 millimetres.

The exterior width 104 of the tyre 3. The exterior width 104 is between 20 and 150 millimetres, for example around 50 millimetres.

The width 105 of the hub of the wheel body 2. The width 105 is less than the exterior width 104 of the tyre, or around 45 millimetres in this case.

The average thickness 106 of the plate that forms a flange 5, 7. The average thickness 106 has a nominal value of 2.5 millimetres, here.

The width 107 of the peripheral surface 59 of the teeth 63. The width 107 is between 3 and 20 millimetres, for example around 6 millimetres.

The thickness 108 of the tread 23. The thickness 108 is measured away from the regions connecting to the other parts of the tyre 3. In this case, the thicknesses of the tread 23, of the sole 21 without the heel 31, of the first sidewall 25 and of the internal portion 51 of the second sidewall 27 are substantially equivalent. The thickness 108 is between 4 and 15 millimetres, for example around 10.5 millimetres.

The height of the external portion 53 is deduced from the difference between the maximum diameter 100 and the maximum diameter 102. The height of the external portion 53 is for example around 33.5 millimetres, here. The height of the external portion 53 generally represents between 45% and 70% of the overall height of the second sidewall 27, which is for its part deduced from the difference between the maximum diameter 100 and the inside diameter 103. For example, the overall height of the second sidewall 27 is around 58 millimetres, here, i.e. a height of the external portion 53 of around 58% of the overall height of the second sidewall 27.

The height of the teeth 63 is deduced from the difference between the maximum diameter 100 and the maximum diameter 101. The height of the teeth 63 is for example around 25 millimetres, here.

The examples of dimensions mentioned above are combined in the embodiment shown in FIG. 5. In further embodiments, the dimensions are jointly selected while preserving the dynamic behaviour of the tyre 3 as described below. For example, the proportions between the abovementioned dimensions are substantially the same as those of the embodiment in FIG. 5.

The first sidewall 25 and the tread 23 are designed so as to jointly hold the external portion 53 of the second sidewall 27 in line with the internal portion 51. The shape and composition of the first sidewall 25 and of the tread 23 are jointly designed to hold the external portion 53 of the second sidewall 27 in an axial direction XX. Under load, the external portion 53 of the second sidewall 27 comes into contact with the ground 150 and is subjected to significant stresses. The stresses are essentially oriented in the radial directions. The hold provided jointly by the first sidewall 25 and the tread 23 counters the bending, or buckling, of the external portion 53 of the second sidewall 27. The external portion 53 of the second sidewall 27 is shaped so as to have rigidity greater than that of the soil, such that the external portion 53 is inserted into the ground 150 more or less in a radial direction. However, when passing over substantially hard areas or stones, the external portion 53 deforms elastically without rupturing. Thereafter, it returns to its normal orientation. In contrast to metal implements, no maintenance operation is necessary.

In this case, the external portion 53 exhibits rigid dynamic behaviour, while the first sidewall 25 and the tread 23 exhibit flexible dynamic behaviour. Thus, the first sidewall 25 and the tread 23 may exhibit significant deformation in a radial direction, under the effect of compression, while holding the external portion 53 in an axial direction. The external portion 53, for its part, exhibits little radial deformation under the effect of compression. In operation, the teeth 63 of the external portion 53 make it possible to concentrate the compressive force over a small area, corresponding substantially to the peripheral surface 59. Penetration into the ground 150 is made easier.

In the example described here, the tyre 3 is made in one piece. The tyre 3 is produced from elastomer, for example rubber or polyurethane. In the example described here, the tyre 3 is produced from a single elastomer. The elastomer has a Shore A hardness of between 63 and 70, for example 65 Shore.

In variants, the tyre 3 is produced from at least two materials with different hardnesses from one another. In this case, the tyre 3 is produced by moulding or extruding two different parts and then joining them together. For example, the first sidewall 25 and the tread 23 can be produced from an elastomer, while the second sidewall 27 or the external portion 53 is produced from another elastomer, from a thermoplastic elastomer and/or a thermoplastic.

In one embodiment, the first sidewall 25 and the tread 23 comprise an elastomer with a Shore A hardness of between 50 and 65, for example 55 Shore. The second sidewall 27 comprises an elastomer with a Shore A hardness of between 70 and 90, for example 80 Shore. The use of a tyre 3 in which the second sidewall 27 has a different hardness from that of the tread 23 and of the first sidewall 25 makes it possible to accentuate the difference in dynamic behaviour between the two parts of the tyre 3. In particular, the external portion 53 is made more rigid, while the first sidewall 25 and the tread 23 are made more flexible. The combination of the structure and the composition of the different parts of the tyre 3 is refined depending on the desired dynamic behaviour of the tyre 3. For example, specific combinations can be provided depending on the quality of soil to be worked. Consequently, the combinations of structures and compositions can be adapted depending on the climate and geographic regions in which the wheels 1 are intended to be used.

In operation, the wheel 1 can be mounted on an axle of which the main axis is substantially horizontal and perpendicular to the direction of forward travel of the agricultural machine. A wheel 1 can be used on its own or in combination with similar wheels 1.

Figure 7:
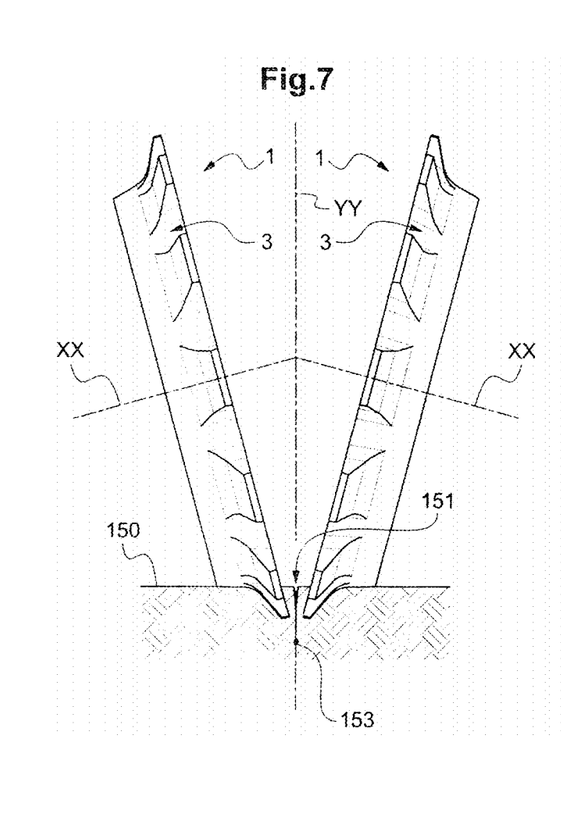
FIGS. 7 and 8 each show a front view of a pair of wheels similar to those in FIGS. 1 to 6 in operation in two embodiments of a V-setup.

In a variant, a wheel 1, on its own or in combination with other wheels 1, can be mounted on an axle of which the main axis is inclined with respect to the horizontal and/or is not perpendicular to the direction of forward travel of the agricultural machine. FIGS. 7 and 8 show configurations in which two wheels 1 work together and of which the axes of rotation are inclined with respect to the horizontal.

FIGS. 7 and 8 each show an agricultural implement equipped with a pair of wheels 1 similar to the one described thus far. Such an implement can form, for example, the rear implement of a seeder. The structure carrying the wheels 1 has not been shown. The pair of wheels 1 has, in front view, a V-shaped configuration. Such a configuration makes it possible, for example, to close a furrow 151 at the bottom of which a grain 153 has been deposited. When the wheels roll next to the furrow 151, the soil tends to be driven laterally to close the furrow 151. In a variant, a single wheel 1 could be enough to close the furrow 151. In this case, two wheels 1 roll on either side of the furrow 151. The two wheels 1 are symmetric with respect to one another about a vertical mid plane YY passing through the furrow 151. The wheels 1 are not disposed vertically but, by contrast, oriented partially towards the ground 150. Their respective axis of rotation XX is substantially inclined with respect to the horizontal. They form, for example, an angle of between 5° and 15° with the horizontal. Thus, the combination of the inclination of the wheels 1 and of the external portions 53 makes it possible to close the furrow 151 by returning the soil simultaneously from each side of the furrow 151. Moreover, the impressions formed by the teeth 63 in the soil can constitute reservoirs which are filled with water, from rain or irrigation. This makes it possible, for example, to improve the continuity with which the grain 153 is supplied with water between two periods of rain.

In the configuration shown in FIG. 7, the sides bearing the external portion 53 of each of the wheels 1 substantially face one another and are at the centre of the V-shaped configuration. In other words, the two wheels 1 are mutually arranged symmetrically with respect to one another about a mid plane YY and such that the second sidewalls 27 of each of the wheels 1 are disposed on the side of the mid plane YY. Such mounting makes it possible to apply a force oriented substantially vertically from the top of the grain 153 to the flanks of the furrow 151. The walls of the furrow 151 are crumbled and cover the grain 153. Thus, even in the event of abundant rain or wind, the risk of the grain 153 being carried away out of the furrow 151 is limited.

In the configuration shown in FIG. 8, the sides bearing the external portion 53 of each of the wheels 1 are disposed laterally towards the outside of the V-shaped configuration. The two wheels 1 are arranged symmetrically with respect to one another about the mid plane YY, such that the first sidewall 25 of each of the wheels 1 is oriented towards the mid plane YY. The first sidewalls 25 of the wheels 1 are further apart from one another than in the case of FIG. 7. Such mounting makes it possible to apply two forces that are oriented laterally and in the opposite direction to one another from each side of the grain 153 to the flanks of the furrow 151. The furrow 151 then tends to be closed on itself. Here, too, even in the event of abundant rain or wind, the risk of the grain 153 being carried away out of the furrow 151 is limited.

In variants that can be combined with the embodiments in FIGS. 7 and 8, the wheels 1 can be mounted in pairs in a V-shaped configuration in top view. The wheels 1 are disposed at a non-zero angle with respect to the direction of forward travel. Their respective axis of rotation XX is not perpendicular to the direction of forward travel. The plane of the wheels forms for example an angle of between 5° and 15° with the direction of forward travel. In this case, one of the sidewalls of the tyre cover 3 pushes the soil. Such operation is reminiscent of the operation of a snowplough blade. A single wheel 1, in contrast to pairwise mounting, can also be inclined with respect to the direction of forward travel and/or with respect to the horizontal.

Thus far, the operation of the tyres according to the invention has been described in the context of the operation of a seeder. The wheels according to the invention are not limited to this use and can equip implements mounted on other types of agricultural machine for working the ground.

The invention is not limited to the examples of tyres described above, only by way of example, but encompasses all the variants that can be envisaged by a person skilled in the art in the scope of the following claims.

The invention claimed is:

1. A non-inflatable tire for an agricultural implement comprising:
    a sole;
    a tread; and
    a pair of sidewalls connecting the sole to the tread, the pair of sidewalls including a first sidewall and a second sidewall,
    the sole, the tread, the first sidewall, and the second sidewall jointly defining a free space, the free space having an annular overall shape and being continuous in a circumference of the tire, while an opening places the free space in fluidic communication with an outside of the tire,
    wherein the tread has a frustoconical overall shape, an apex of which is situated beyond the first sidewall,
    wherein the first sidewall extends from the sole to the tread, while the second sidewall comprises an internal portion which extends from the sole to the tread and an external portion projecting from the tread, and
    wherein the first sidewall and the tread are designed so as to jointly hold the external portion of the second sidewall in line with the internal portion, and
    wherein the external portion comprises teeth distributed around a periphery of the tread, and each of the teeth includes a peripheral surface that is parallel to a rotational axis of the tire.

2. The tire according to claim 1, wherein the external portion has a height of between 45% and 70% of an overall height of the second sidewall.

3. The tire according to claim 1, wherein the external portion has a profile which narrows in a radial direction oriented from the inside to the outside.

4. The tire according to claim 1, wherein the second sidewall bears a lateral surface that is oriented towards the outside of the tire and is substantially continuous between the internal portion and the external portion.

5. The tire according to claim 1, wherein the first sidewall and the tread comprise an elastomer and the second sidewall comprises an elastomer, a thermoplastic elastomer and/or a thermoplastic with a hardness greater than that of the elastomer of the first sidewall and of the tread.

6. The tire according to claim 1, comprising an elastomer with a Shore A hardness of between 63 and 70.

7. The tire according to claim 1, wherein the first sidewall and the tread comprise an elastomer with a Shore A hardness of between 50 and 65, and wherein the second sidewall comprises an elastomer with a Shore A hardness of between 70 and 90.

8. The tire according to claim 1, wherein the peripheral surface has a width in a direction of the rotational axis that is less than a thickness of the internal portion.

9. The tire according to claim 1, wherein the sidewalls are parallel to one another and are perpendicular to the rotational axis of the tire.

10. The tire according to claim 1, wherein the external portion of the second sidewall includes a lateral surface that forms a non-zero angle with the second sidewall.

11. The tire according to claim 1, wherein a height of the first sidewall in a radial direction is less than a height of the internal portion of the second sidewall in the radial direction, and
    wherein the tread connects a radial end of the first sidewall to a radial end of the internal portion of the second sidewall, an exterior surface of the tread increasing radially from the radial end of the first sidewall to the radial end of the second sidewall.

12. An agricultural implement comprising at least one wheel that includes a wheel body and a tire according to claim 1 mounted around the wheel body.

13. The agricultural implement according to claim 12, wherein the wheel is mounted so as to rotate about an axis, the axis being inclined at a non-zero angle with respect to the ground and/or inclined at a non-right angle with respect to the direction of forward travel of the agricultural implement.

14. The agricultural implement according to claim 12, comprising at least two wheels that each include a wheel body and a tire mounted around the wheel body, each of the two wheels being mounted so as to rotate in such a way that its axis of rotation is inclined with respect to the ground.

15. The agricultural implement according to claim 14, wherein the two wheels are arranged symmetrically with respect to one another about a mid plane such that the first sidewalls of the wheels are oriented towards the mid plane.

16. The agricultural implement according to claim 14, wherein the two wheels are arranged symmetrically with respect to one another about a mid plane and such that the second sidewalls of the wheels are oriented towards the mid plane.

\* \* \* \* \*